United States Patent
Tran et al.

(10) Patent No.: US 9,954,351 B2
(45) Date of Patent: Apr. 24, 2018

(54) SYSTEM FOR IMPLEMENTATION OF I²T TRIP CHARACTERISTIC

(71) Applicant: LEACH INTERNATIONAL CORPORATION, Buena Park, CA (US)

(72) Inventors: Anhtai Le Tran, Santa Ana, CA (US); Imtiaz Khan, Trabuco Canyon, CA (US)

(73) Assignee: LEACH INTERNATIONAL CORPORATION, Buena Park, CA (US)

( * ) Notice: Subject to any disclaimer, the term of this patent is extended or adjusted under 35 U.S.C. 154(b) by 331 days.

(21) Appl. No.: 14/923,372

(22) Filed: Oct. 26, 2015

(65) Prior Publication Data

US 2017/0117698 A1    Apr. 27, 2017

(51) Int. Cl.
*H02H 3/00* (2006.01)
*H02H 3/08* (2006.01)

(52) U.S. Cl.
CPC ................................... *H02H 3/08* (2013.01)

(58) Field of Classification Search
CPC ....................................................... H02H 3/08
See application file for complete search history.

(56) References Cited

U.S. PATENT DOCUMENTS

| | | | | |
|---|---|---|---|---|
| 3,906,309 A * | 9/1975 | Sullivan | ................... | H02H 1/04 361/101 |
| 3,982,158 A * | 9/1976 | Knauer | ................... | H02H 3/025 361/5 |
| 4,409,542 A * | 10/1983 | Becker | ................... | H02H 3/365 324/434 |
| 8,879,226 B2 * | 11/2014 | Esumi | ................ | H03K 17/0822 361/93.1 |
| 9,190,828 B2 * | 11/2015 | Seon | ........................ | H02H 3/08 |

* cited by examiner

*Primary Examiner* — Stephen W Jackson
(74) *Attorney, Agent, or Firm* — Lewis Roca Rothgerber Christie LLP

(57) ABSTRACT

There is provided a protection circuit configured to indicate an overcurrent condition of a conductor conducting a load current, the protection circuit including a first current integrator and a second current integrator, each of the first and second integrators being configured to integrate an input voltage proportional to the load current, a summing amplifier configured to receive an offset voltage, to amplify a signal from the second integrator, and to generate a trip threshold based on the input voltage and the offset voltage, and a comparator configured to compare an output of the first current integrator and the trip threshold, and to generate a trip signal at a trip time when the trip threshold is equal to an output of the first integrator, the trip signal indicating an overcurrent condition.

17 Claims, 4 Drawing Sheets

SYSTEM FOR IMPLEMENTATION OF I²T TRIP CHARACTERISTIC

FIELD

Aspects of the invention relate to the field of electrical circuit protection.

BACKGROUND

Electronic protection devices (also referred to as "fuses" or "circuit breakers") are designed to protect a conductor (e.g., a wire) against over-current and short-circuit incidents. To prevent over-heating and potential damage to the conductor, an electronic protection device is conventionally configured to trip before a thermal capacity of the conductor is exceeded.

Solid state devices, including solid state power controllers (SSPCs) mimic the behavior of fuses and circuit breakers by monitoring the current passing through the conductor and calculating the amount of power ($I^2R$) dissipated by the conductor over time. The trip time of the solid state devices is inversely proportional to the dissipated power (i.e., the square of current). The trip characteristic of these devices, which determines the trip time, is often referred to as the $I^2t$ trip characteristic (where the term "$I^2t$", or ampere-squared-seconds, is an expression of the energy or heat generated by electrical current) and may be mathematically expressed through the following equation:

$$\int_{t0}^{t1} \frac{(I^2 - I_{Threshold}^2)}{I_{Rated}^2} dt \geq K_1 \qquad \text{Equation 1}$$

where I is the load current passing through the conductor, $I_{Threshold}$ is the trip threshold current (or fault current), $I_{Rated}$ is the nominal current rating of the conductor, and $K_1$ is a constant. Equation 1 may be restated in a simplified form as $$\int_{t0}^{t1} I^2 dt \geq K_2 \qquad \text{Equation 2}$$

where K2 is a constant that accounts for $K_1$, $I_{Rated}$ and $I_{Threshold}$.

When the accumulated value of the integrals of Equations 1 and 2 exceed $K_1$ and $K_2$, respectively, the electronic protection device trips and isolates the fault. This trip characteristic is graphically represented by curve 10 of FIG. 1.

Conventional implementations of the above I²t trip characteristic involve the use of complex circuits, which include multipliers for squaring a current value and integrators for integrating the squared current over time, to achieve a true I²t trip characteristic. However, the use of a multiplier may increase the size, complexity, power consumption, and cost of the electronic protection device and reduce its reliability.

The above information disclosed in this Background section is only for enhancement of understanding of the background of the invention and therefore it may contain information that does not form the prior art that is already known to a person of ordinary skill in the art.

SUMMARY

Aspects of embodiments of the invention are directed toward a low-power, simple, and cost-effective system for implementing an accurate approximation of the I²t trip characteristics for power controllers (e.g., solid state power controllers (SSPCs)) using an analog circuit. In some applications, the use of analog circuits may be preferred over electronic circuits containing complex hardware and/or software, as it may improve reliability while reducing size, power consumption, and cost of the system over conventional solutions.

Aspects of embodiments of the invention are directed toward an analog circuit for providing a close approximation of the I²t trip characteristic by integrating the conductor current with respect to time without squaring the current value.

According to some exemplary embodiments of the invention, there is provided a protection circuit configured to indicate an overcurrent condition of a conductor conducting a load current, the protection circuit including: a first current integrator and a second current integrator, each of the first and second integrators being configured to integrate an input voltage proportional to the load current; a summing amplifier configured to receive an offset voltage, to amplify a signal from the second integrator, and to generate a trip threshold based on the input voltage and the offset voltage; and a comparator configured to compare an output of the first current integrator and the trip threshold, and to generate a trip signal at a trip time when the trip threshold is equal to an output of the first integrator, the trip signal indicating an overcurrent condition.

In an embodiment, the trip time of the comparator is inversely proportional to a magnitude of the load current.

In an embodiment, the trip time of the comparator and the input voltage at the trip time have a relationship approximating an I²t trip curve within an R-squared value of 0.99%.

In an embodiment, rates of change of outputs of the first and second current integrators are proportional to a magnitude of the load current.

In an embodiment, the output of the summing amplifier is substantially equal to the offset voltage when the input voltage is less than the offset voltage.

In an embodiment, the summing amplifier is configured to lower the trip threshold as the input voltage increases beyond an offset voltage.

In an embodiment, the summing amplifier includes a non-inverting amplifier and an inverting amplifier.

In an embodiment, the non-inverting amplifier is configured to receive an offset voltage and to shift the input voltage by the offset voltage, and the inverting amplifier is configured to multiply the shifted input voltage by a negative gain value, and to generate the trip threshold based on the shifted input voltage.

In an embodiment, the comparator includes an operational amplifier, an inverting input of the operational amplifier being coupled to the output of the summing amplifier, and a non-inverting input of the operational amplifier being coupled to the output of the first integrator.

In an embodiment, each of the first and second integrators includes a resistor configured to receive the input voltage, and a capacitor coupled to the resistor at an output of a respective one of the first and second integrators.

In an embodiment, the summing amplifier is configured to transmit the trip signal to a relay configured to cut off the current in response to the trip signal.

According to some exemplary embodiments of the invention, there is provided a system including: a load; a power source configured to supply power to the load; a switch coupled between the power source and the load; and a protection circuit configured to sense a load current passing through the load and to generate a trip signal indicative of an overcurrent condition, the protection circuit including: a first current integrator and a second current integrator, each of the first and second integrators being configured to integrate an input voltage proportional to the load current; a summing amplifier configured to receive an offset voltage, to amplify a signal from the second integrator, and to generate a dynamic trip threshold based on the input voltage and the offset voltage; and a comparator configured to compare an output of the first current integrator and the dynamic trip threshold, and to generate a trip signal at a trip time when the dynamic trip threshold is equal to an output of the first integrator, the trip signal indicating an overcurrent condition, and wherein the switch is configured to actuate in response to receiving the trip signal, and to stop current flow from the power source to the load.

BRIEF DESCRIPTION OF THE DRAWINGS

The above and other features and aspects of the invention will become more apparent by the following detailed description of exemplary embodiments thereof with reference to the attached drawings, in which.

DETAILED DESCRIPTION

Figure 1:
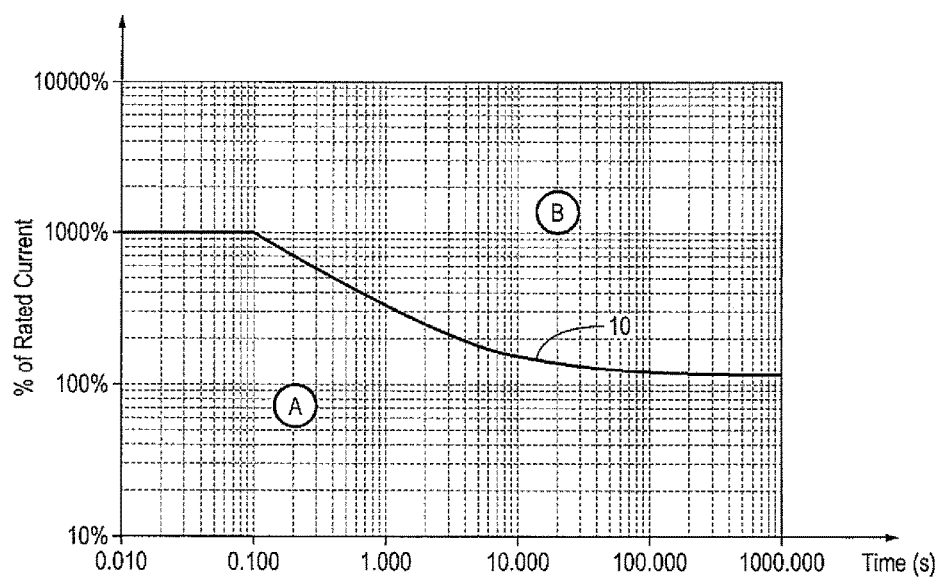
FIG. 1 is a diagram illustrating an ideal $I^2t$ trip characteristic of an electronic protection device.

The attached drawings for illustrating exemplary embodiments of the invention are referred to in order to gain a sufficient understanding of the invention, the merits thereof, and the objectives accomplished by the implementation of the invention. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art.

Hereinafter, the invention will be described in detail by explaining exemplary embodiments of the invention with reference to the attached drawings. In the drawings, like reference numerals are used throughout the figures to reference like features and components.

Figure 2:
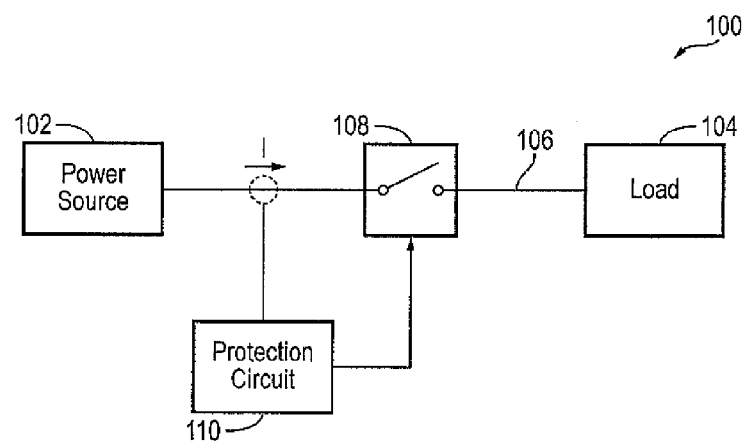
FIG. 2 is a block diagram illustrating a system utilizing a protection circuit according to some exemplary embodiments of the invention.

FIG. 2 is a block diagram illustrating a system 100 utilizing a protection circuit 110 according to some exemplary embodiments of the invention.

Referring to FIG. 2, the system 100 may include a power source 102, a load 104 powered by the power source 102 though a conductor (e.g., a wire) 106, a switch (e.g., relay) 108 for switchably connecting the power source 102 and the load 104 (i.e., the switch 108 is located in a current path between the power source 102 and the load 104), and a protection circuit 110 for monitoring the current I passing through the conductor 106 and controlling the operation (e.g., activation and deactivation) of the switch 108 based on the monitored current I.

According to some embodiments, the protection circuit 110 maintains the switch 108 in an activated state (e.g., a closed or turned ON state) when the conductor current I is at a level that does not exceed the thermal capacity of the conductor 106, and deactivates (e.g., opens, turns OFF, or "trips") the switch 108 when the thermal capacity of the conductor 106 is reached or exceeded. The trip characteristic of the protection circuit 110 may be substantially similar to that shown in FIG. 1, where the protection circuit 110 ensures that the current-supplying operation of the system 100 is confined to region A (e.g., the area below the curve 10) in FIG. 1 and does not reach region B (e.g., the area above the curve 10) in FIG. 1. For example, the protection circuit 110 deactivates the switch 108 within about 100 millisecond of a current, which is 10 times higher than the conductor's rated current, passing through the conductor 106. In some examples, deactivation may occur within about 4 seconds of passage of a current that is twice the rated current.

Thus, the protection circuit 110 isolates a fault in the system 100 (e.g., a short circuit in the load 104) in a timely manner, by preventing an overcurrent condition that exceeds the thermal capacity of the conductor 106.

The protection circuit 110 may sense (e.g., measure) the current I using a sense resistor, a hall effect sensor, and/or any other suitable means known to a person of ordinary skill in the art. The switch 108 may be an electro-mechanical relay, a solid state switch, or the like.

Figure 3:
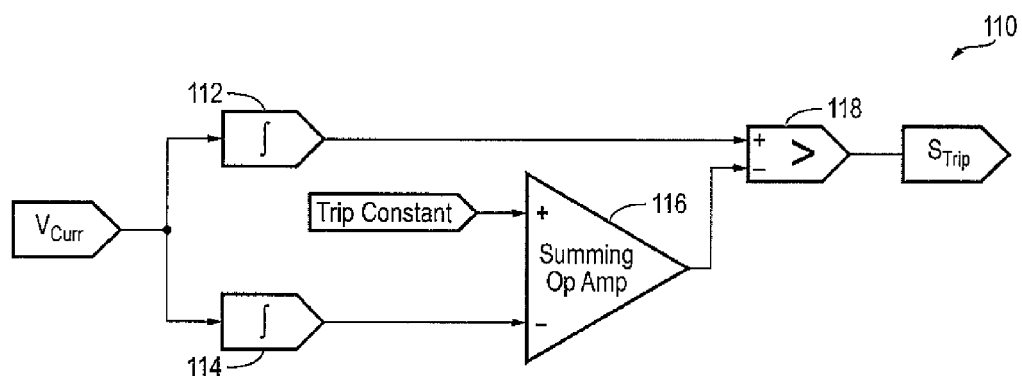
FIG. 3 is a block diagram illustrating a protection circuit according to some exemplary embodiments of the invention.

FIG. 3 is a block diagram illustrating a protection circuit 110 according to some exemplary embodiments of the invention.

In some embodiments, the protection circuit 110 may include a first current integrator 112, a second current integrator 114, a summing amplifier 116 and a comparator 118. Each of the first and second current integrators 112 and 114 integrates an input voltage $V_{Curr}$ that is proportional to the sensed current I. In some examples, the input voltage $V_{Curr}$ represents a voltage output of a current sensor within the protection circuit 110 measuring the sensed current I. The summing amplifier 116 amplifies a signal from the second current integrator 114 to generate a trip threshold (e.g., a dynamic trip threshold) that is based on the input voltage $V_{Curr}$ (which is proportional to the current I). The comparator 118 compares the output of the first current integrator 112 with the trip threshold, and generates a trip signal $S_{Trip}$ when the comparative relationship between the output of the first current integrator 112 and the trip threshold has changed. For example, upon being tripped, the comparator 118 may output a voltage that is higher (or lower) than that outputted before being tripped.

During the normal operation of the system 100, the output of the first current integrator 112 may differ from (e.g., have a lower voltage than) that of the summing amplifier 116. However, as the input voltage $V_{Curr}$ (i.e., the conductor current I) increases, the two outputs may approach one another. The comparator 118 generates the trip signal $S_{Trip}$ when the trip threshold and the output of the first current integrator 112 become substantially equal. This time may be referred to as the trip time. The protection circuit 110 operates such that the trip time is inversely related to a magnitude of the conductor current I.

Thus, the protection circuit 110 monitors the integrated current flowing into the load 104 and compares it against a dynamic trip threshold to determine when the maximum allowable energy has accumulated in the conductor 106.

According to some embodiments, the protection circuit 110 achieves the effect of $I^2$ t trip characteristic, without the use of a multiplier or a complex circuit. The protection circuit 110 eliminates the squaring of the current by factoring the trip constant into a function of the current value. For example, the summing amplifier 116 lowers the trip threshold as the input voltage $V_{Curr}$ increases beyond the trip constant.

Figure 4:
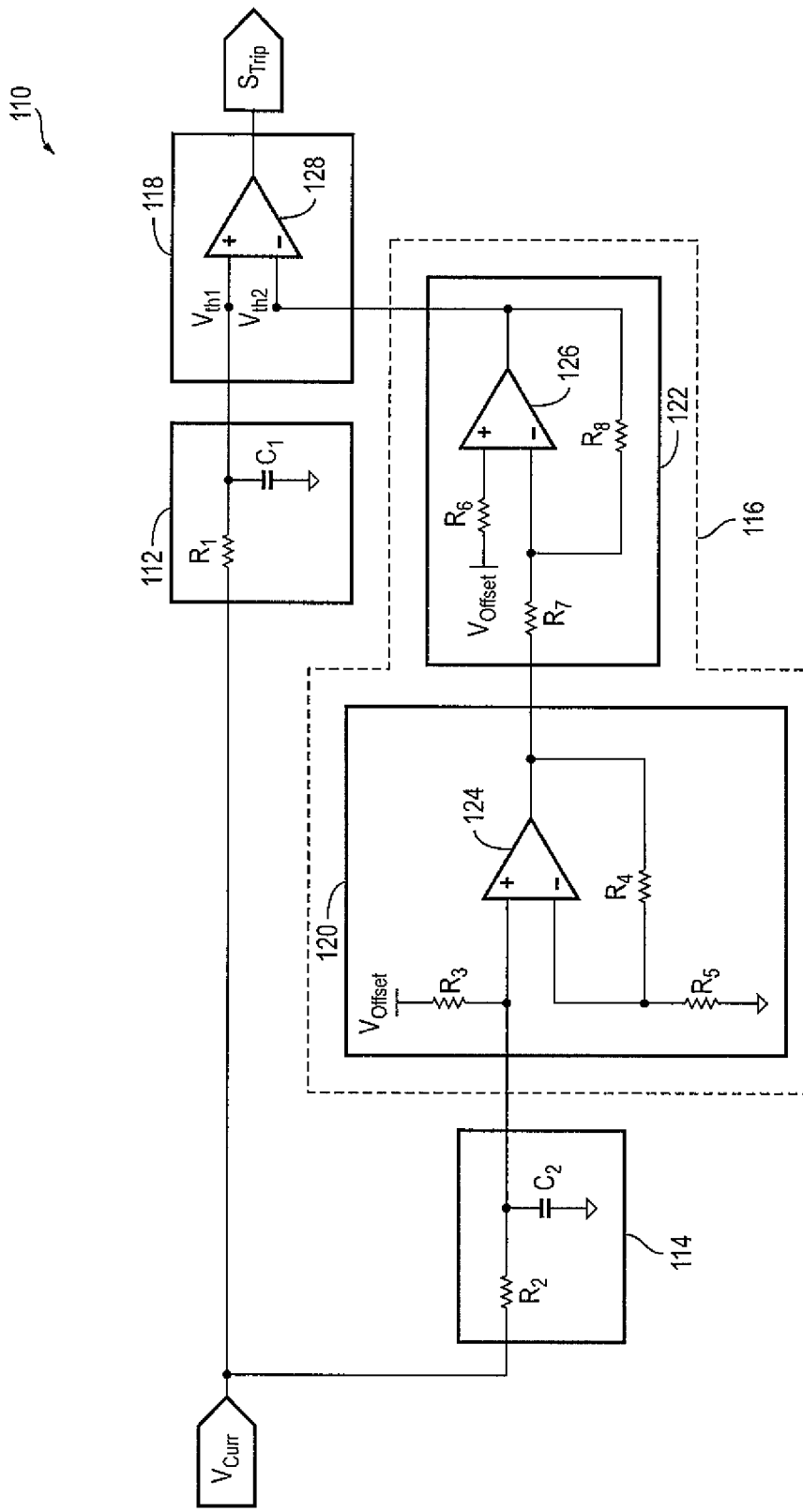
FIG. 4 is a circuit diagram illustrating the protection circuit of FIG. 3 according to some exemplary embodiments of the invention.

FIG. 4 is a circuit diagram illustrating the protection circuit 110 of FIG. 3 according to some exemplary embodiments of the invention.

Referring to FIG. 4, the first and second current integrators 112 and 114, according to some embodiments, are configured as low-pass RC filters, with the first current integrator 112 including a first resistor $R_1$ and first capacitor $C_1$, and the second current integrator 114 including a second resistor $R_2$ and second capacitor $C_2$.

The first current integrator 112 receives the input voltage $V_{Curr}$, which is proportional to the sensed current I at the conductor 106, at its input (e.g., at a first terminal of the first resistor $R_1$) and integrates the input voltage $V_{Curr}$ to generate a first threshold $V_{th1}$ at its output (e.g., at a second terminal of the first resistor $R_1$). The output of the first current integrator 112 is coupled to the first input of the comparator 118.

The second current integrator 114 receives the input voltage $V_{Curr}$ at its input (e.g., at a first terminal of the second resistor $R_2$) and generates an integrated input voltage $V_{Curr}$ at its output (e.g., at a second terminal of the first resistor $R_1$). The output of the second current integrator 114 is coupled to the input of the summing amplifier 116.

In some embodiments, the summing amplifier 116 includes a non-inverting amplifier 120 and an inverting amplifier (e.g., negative gain amplifier) 122.

The non-inverting amplifier 120 includes a first operational amplifier 124 having a first input (e.g., a non-inverting input) resistively coupled to the offset voltage $V_{Offset}$ through a third resistor $R_3$, and a second input (e.g., an inverting input) that has a feedback connection to the output of the first operational amplifier 124 through a first voltage divider network including fourth and fifth resistors $R_4$ and $R_5$. In some embodiments, the values of the third to fifth resistors $R_3$-$R_5$ may be chosen such that the non-inverting amplifier 120 functions as a unity gain amplifier generating at its output the voltage at its input (e.g., at the first input of the first operational amplifier 124) shifted by the offset voltage $V_{Offset}$. However, embodiments of the invention are not limited thereto, and the non-inverting amplifier 120 may have any suitable non-unity gain.

The inverting amplifier 122 includes a second operational amplifier 126 having a first input (e.g., a non-inverting input) resistively coupled to the offset voltage $V_{Offset}$ through a sixth resistor $R_6$, and a second input (e.g., an inverting input) that has a feedback connection to the output of the second operational amplifier 126 through a second voltage divider network including seventh and eighth resistors $R_7$ and $R_8$. In some embodiments, the values of the seventh and eighth resistors $R_7$ and $R_8$ may be chosen such that the inverting amplifier 126 functions as an inverting amplifier generating at its output the dynamic trip threshold that is negatively proportional to the voltage at its input (e.g., at the first input of the second operational amplifier 126).

In some embodiments, the comparator 118 includes a third operational amplifier 128 having a first input (e.g., a non-inverting input) coupled to the output of the first current integrator 112, and a second input (e.g., an inverting input) coupled to the output of the summing amplifier 116 (e.g., the output of the second operational amplifier 126).

The offset voltage $V_{Offset}$ is a voltage value that represents the trip constant (e.g., is proportional to the trip threshold current $I_{Threshold}$). In some embodiments, when the input voltage $V_{Curr}$ (which is representative of the current I) is below the offset value, the output of the summing amplifier 116 (e.g., the output of the second operational amplifier 126) is substantially equal to the offset voltage. When the input voltage $V_{Curr}$ exceeds the offset voltage $V_{Offset}$, the second current integrator 114 integrates the input voltage $V_{Curr}$ and the output of the second current integrator 114 increases over time, causing the output of the non-inverting amplifier 120 to concurrently (e.g., simultaneously) increase. This then reduces the voltage at the output of the inverting amplifier 122, which in turn lowers the dynamic trip threshold asserted on the comparator 118.

The magnitude of the input voltage $V_{Curr}$ (i.e., the magnitude of the load current I) is integrated by the first current integrator 112, and is compared by the comparator 118 with the dynamic trip threshold $V_{th2}$ generated by the summing amplifier 116. In some examples, the initial voltage output from the first current integrator 112 (e.g., about zero volts) is lower than the initial output of the summing amplifier 116 (e.g., the offset voltage $V_{Offset}$). In such examples, when the output voltage of the first current integrator 112 exceeds the trip threshold $V_{th2}$ defined by the summing amplifier 116 (e.g., the inverting amplifier 122), the comparator 118 may trip causing the protection circuit 110 to isolate the fault.

According to some embodiments, the rates of change of the output voltages of the first and second current integrators 112 and 114 are directly dependent on the magnitude of the current I (and inversely dependent on $R_1C_1$ and $R_2C_2$, respectively). The capacitors $C_1$ and $C_2$ in the first and second current integrators 112 and 114, respectively, are charged faster when the current I is high, leading to a quick lowering of the trip threshold $V_{th2}$, and a faster tripping of the comparator 118. This may be referred to as a "hard" fault. In contrast, the capacitors $C_1$ and $C_2$ in the first and second current integrators 112 and 114 are charged slower when the current I is low, leading to a slower lowering of the trip threshold $V_{th2}$, and a slower (or delayed) tripping of the comparator 118. This may be referred to as a "soft" fault.

Thus, the overall effect of the operation of the protection circuit 110 is that is exhibits a dynamic trip threshold, which is set as an inverse function of the current I with an offset value. The integrations and the trip constant are moved to the front ends of the protection circuit 110, and both are functions of the load current I. This transposition simplifies the analog circuit of the protection circuit 110 by eliminating the need to square the current I, and forgoing the added cost, complexity, size, and power consumption of a multiplier.

The output voltage $V_{th1}$ of the first current integrator 112 can be expressed, as a function of time, through Equation 3:

$$V_{th1}(t)=V_{Curr}(1-e^{-t/R1C1}) \qquad \text{Equation 3}$$

In some embodiments, the value of the second through eighth resistors $R_2$-$R_8$ may be set as follows:
$R_2=R_5=R_{i1}$
$R_3=R_4=R_{f1}$
$R_7=R_{i2}$
$R_8=R_{f2}$ In such embodiments, the threshold voltage $V_{th2}$ generated by the summing amplifier 116 (e.g., the second operational amplifier 126) may be expressed, as a function of time, through Equation 4:

$$V_{th2}(t) = V_{Offset} - \left(\frac{R_{f1}R_{f2}}{R_{i1}R_{i2}}\right)V_{Curr}\left(1 - e^{-t/\left(\frac{R_{i1}R_{f1}C_2}{R_{i1}+R_{f1}}\right)}\right) \quad \text{Equation 4}$$

When the first and second inputs of comparator 118 become equal (i.e., when $V_{th1}=V_{th2}$ (t)), the comparator 118 is triggered and generates the trip signal $S_{Trip}$. When $V_{curr}$ is zero, $V_{th2}$ is equal to $V_{offset}$. The following Equation 5 is arranged to solve for the input voltage $V_{curr}$ as a function of time:

$$V_{Curr}(t_{Trip}) = \frac{V_{Offset}}{\left(1 - e^{-t_{Trip}/R_1 C_1}\right) + \left(\frac{R_{f1}R_{f2}}{R_{i1}R_{i2}}\right)\left(1 - e^{-t_{Trip}/\left(\frac{R_{i1}R_{f1}C_2}{R_{i1}+R_{f1}}\right)}\right)} \quad \text{Equation 5}$$

where $t_{Trip}$ represents the trip time of the protection circuit 110 for a given input voltage $V_{Curr}$ ($t_{Trip}$), or, equivalently, for a given load current I. Plotting the load current I as a function of trip time $t_{Trip}$ yields an $I^2t$ trip curve that approximates that of FIG. 1, given appropriate selection of the values $R_{i1}$, $R_{i2}$, $R_{f1}$, $R_{f2}$, $C_1$ and $C_2$. The offset voltage $V_{offset}$ is proportional to the trip threshold current $I_{threshold}$, which is determined according to a specific design application and is generally set above the rated current of the conductor 106. The offset voltage $V_{offset}$ is chosen such that the protection circuit 110 does not trip when the load current is less than the trip threshold current $I_{threshold}$. According to some embodiments, the relationship between the offset voltage $V_{offset}$ and the trip threshold current $I_{threshold}$ is expressed as:

$$V_{I_{Threshold}} = V_{Offset} \times \frac{R_{i2}}{R_{i2} + R_{f2}} \quad \text{Equation 6}$$

where $V_{I_{Threshold}}$ represents a voltage output of a current sensor within the protection circuit 110 measuring a load current equal to the trip threshold current $I_{threshold}$. Equation 6 may be derived by setting Vth1 equal to Vth2 (of Equations 3 and 4) after a long period of time has passed (e.g., at time infinity), when C1 and C2 are fully charged and settled.

Figure 5:
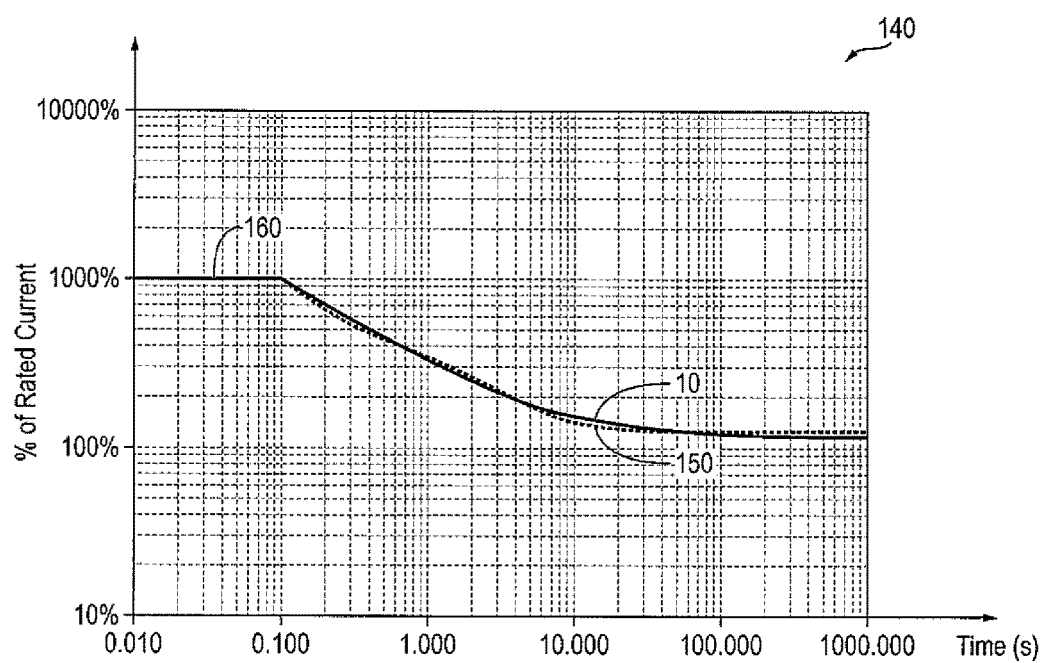
FIG. 5 is a diagram comparing the ideal $I^2t$ trip characteristic with that of the approximated I2t trip characteristic of the protection circuit according to some exemplary embodiments of the invention.

FIG. 5 is a diagram 140 comparing the ideal I2t trip characteristic with that of the approximated I2t trip characteristic of the protection circuit 110 according to some exemplary embodiments of the invention.

Referring to FIG. 5, the curve 150, which represents the approximate $I^2t$ trip characteristic of the protection circuit 110 as defined by Equation 5, closely follows the curve 10, which represents an ideal $I^2t$ trip characteristic as simulated through software. For example, the R-squared calculated value (i.e., the coefficient of determination) between the curves 10 and 150 may be about 0.9996 or higher.

As is shown by Equation 5, the curve 150 may be shifted along the Y-axis of diagram 140, which represents the percentage of rated current, and along the X-axis of diagram 140, which represents time, by adjusting the values of the $R_{i1}$, $R_{i2}$, $R_{f2}$, $C_1$, $C_2$ and $V_{offset}$ values. For example, the values $V_{offset}$, $R_{i2}$ and $R_{f2}$ may be used to set the trip threshold current $I_{threshold}$, moving the curve 150 along the Y-axis. Further, the values $R_{i1}$, $R_{i2}$, $C_1$, and $C_2$ are used to set the characteristic (e.g., shape) of the curve profile along the X-axis.

While the protection circuit 110 generates an $I^2t$ trip characteristic shown by curve 150, the flat region 160 of diagram 140 may be a result of a control signal from a controller (not shown in FIG. 4), which signals the switch 108 (see FIG. 2) to deactivate when the current I exceeds a preset limit (e.g., is 10 times the nominal current rating of the conductor 106).

As will be understood by a person of ordinary skill in the art, in the description above, the first and second operational amplifiers 124, 126 exhibit high gain and operate in their respective linear regions.

The protection circuit 110 according to embodiments of the invention utilizes an analog circuit for providing a close approximation of the $I^2t$ trip characteristic by integrating the conductor current with respect to time without squaring the current value. In so doing the protection circuit 110 according to embodiments of the invention avoids the use of multipliers, which can add to the size, complexity, power consumption, and cost of a device, and can reduce its reliability.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

It will be understood that, although the terms "first", "second", "third", etc., may be used herein to describe various elements, components, and/or sections, these elements, components, and/or sections should not be limited by these terms. These terms are used to distinguish one element, component, or section from another element, component, or section. Thus, a first element, component, or section discussed above could be termed a second element, component, or section, without departing from the spirit and scope of the invention.

The terminology used herein is for the purpose of describing particular embodiments and is not intended to be limiting of the invention. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the invention refers to "one or more embodiments of the invention." Also, the term "exemplary" is intended to refer to an example or illustration.

It will be understood that when an element or component is referred to as being "connected to" or "coupled to" another element or component, it can be directly connected to or coupled to the other element or component, or one or more intervening elements or components may be present. When an element or layer is referred to as being "directly connected to" or "directly coupled to" another element or component, there are no intervening elements or components present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

What is claimed is:

1. A protection circuit configured to indicate an overcurrent condition of a conductor conducting a load current, the protection circuit comprising:
a first current integrator and a second current integrator, each of the first and second current integrators being configured to integrate an input voltage proportional to the load current;
a summing amplifier configured to receive an offset voltage, to amplify a signal from the second current integrator, and to generate a trip threshold based on the input voltage and the offset voltage; and
a comparator configured to compare an output of the first current integrator and the trip threshold, and to generate a trip signal at a trip time when the trip threshold is equal to an output of the first current integrator, the trip signal indicating an overcurrent condition.

2. The protection circuit of claim 1, wherein the trip time of the comparator is inversely proportional to a magnitude of the load current.

3. The protection circuit of claim 1, wherein the trip time of the comparator and the input voltage at the trip time have a relationship approximating an $I^2t$ trip curve within an R-squared value of 0.9996.

4. The protection circuit of claim 1, wherein rates of change of outputs of the first and second current integrators are proportional to a magnitude of the load current.

5. The protection circuit of claim 1, wherein the output of the summing amplifier is substantially equal to the offset voltage when the input voltage is less than the offset voltage.

6. The protection circuit of claim 1, wherein the summing amplifier is configured to lower the trip threshold as the input voltage increases beyond an offset voltage.

7. The protection circuit of claim 1, wherein the summing amplifier comprises a non-inverting amplifier and an inverting amplifier.

8. The protection circuit of claim 7,
wherein the non-inverting amplifier is configured to receive an offset voltage and to shift the input voltage by the offset voltage, and
wherein the inverting amplifier is configured to multiply the shifted input voltage by a negative gain value, and to generate the trip threshold based on the shifted input voltage.

9. The protection circuit of claim 1, wherein the comparator comprises an operational amplifier, an inverting input of the operational amplifier being coupled to the output of the summing amplifier, and a non-inverting input of the operational amplifier being coupled to the output of the first current integrator.

10. The protection circuit of claim 1, wherein each of the first and second current integrators comprises a resistor configured to receive the input voltage, and a capacitor coupled to the resistor at an output of a respective one of the first and second current integrators.

11. The protection circuit of claim 1, wherein the summing amplifier is configured to transmit the trip signal to a relay configured to cut off the load current in response to the trip signal.

12. A system comprising:
a load;
a power source configured to supply power to the load;
a switch coupled between the power source and the load; and
a protection circuit configured to sense a load current passing through the load and to generate a trip signal indicative of an overcurrent condition, the protection circuit comprising:
a first current integrator and a second current integrator, each of the first and second current integrators being configured to integrate an input voltage proportional to the load current;
a summing amplifier configured to receive an offset voltage, to amplify a signal from the second current integrator, and to generate a dynamic trip threshold based on the input voltage and the offset voltage; and
a comparator configured to compare an output of the first current integrator and the dynamic trip threshold, and to generate a trip signal at a trip time when the dynamic trip threshold is equal to an output of the first current integrator, the trip signal indicating an overcurrent condition, and
wherein the switch is configured to actuate in response to receiving the trip signal, and to stop current flow from the power source to the load.

13. The system of claim 12, wherein the trip time of the comparator is inversely proportional to a magnitude of the load current.

14. The system of claim 12, wherein rates of change of outputs of the first and second current integrators are proportional to a magnitude of the load current.

15. The system of claim 12,
wherein the output of the summing amplifier is substantially equal to the offset voltage when the input voltage is less than the offset voltage, and
wherein the summing amplifier is configured to lower the dynamic trip threshold as the input voltage increases beyond an offset voltage.

16. The system of claim 12,
wherein the summing amplifier comprises a non-inverting amplifier and an inverting amplifier,
wherein the non-inverting amplifier is configured to receive an offset voltage and to shift the input voltage by the offset voltage, and
wherein the inverting amplifier is configured to multiply the shifted input voltage by a negative gain value.

17. The system of claim 12, wherein the comparator comprises an operational amplifier, an inverting input of the operational amplifier being coupled to the output of the summing amplifier, and a non-inverting input of the operational amplifier being coupled to the output of the first current integrator.

* * * * *